United States Patent [19]

Sperko

[11] Patent Number: 4,932,160
[45] Date of Patent: Jun. 12, 1990

[54] CLOSURE APPARATUS AND METHOD

[75] Inventor: Walter J. Sperko, Kernersville, N.C.

[73] Assignee: Sterilizer Technologies Corporation, Greensboro, N.C.

[21] Appl. No.: 347,344

[22] Filed: May 4, 1989

[51] Int. Cl.$^5$ .............................................. E05D 15/58
[52] U.S. Cl. ...................................... 49/254; 49/277; 49/506
[58] Field of Search .......................... 49/477, 254, 506

[56] References Cited

U.S. PATENT DOCUMENTS

| | | | |
|---|---|---|---|
| 3,694,962 | 10/1972 | McDonald et al. | 49/477 |
| 3,768,203 | 10/1973 | Bellucci | 49/254 |
| 3,788,689 | 1/1974 | Lloyd | 49/254 X |
| 4,262,447 | 4/1981 | Schneier et al. | 49/254 |
| 4,549,497 | 10/1985 | Van Hove | 49/477 X |

Primary Examiner—Philip C. Kannan

[57] ABSTRACT

Closure apparatus and the method of operating the same is presented for an autoclave or other equipment which requires an air tight seal to be maintained. The closure apparatus includes a door which is hingedly joined to a chamber housing. Hinge members attached to the door include a cam connected to a cam shaft which is driven by an electric motor. The can includes a latch member to cause the door to pivot and laterally slide in to engagement with a channel seal surrounding the opening. A movable gasket is in the channel is fluidly urged against the inside of the door to provide an air tight seal thereto when the door is fully closed.

26 Claims, 4 Drawing Sheets

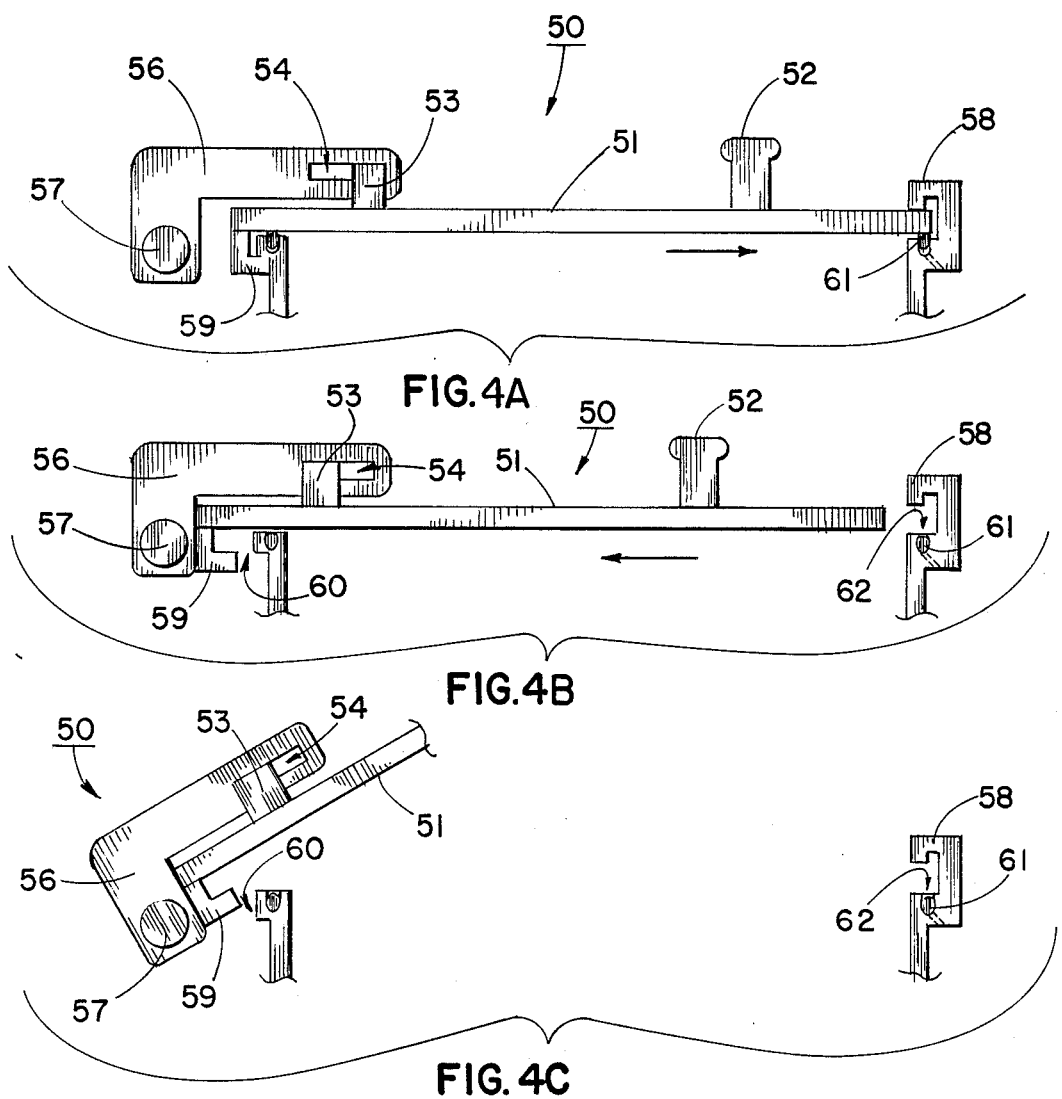

CLOSURE APPARATUS AND METHOD

BACKGROUND OF THE INVENTION

1. Field Of The Invention

The present invention relates to closure apparatus and methods for releasably sealing a chamber opening, specifically autoclaves and sterilizers which are used in hospitals or the like to sterilize garments, medical equipment, and other bacteria containing materials.

2. Description Of The Prior Art And Objectives Of The Invention

It is conventional in the autoclave art to provide a pressure chamber for receiving various articles for sterilizing purposes. Conventional autoclaves are manufactured by a number of companies that provide a means to releasably seal the autoclave during use and thereafter the autoclave can be opened slowly and with a great deal of care, to prevent the contained steam from escaping quickly and injuring the operator. Various types of handles and pressure latches are provided with known autoclaves and sterilizers though some prior art devices are oftentimes difficult to properly seal, to safely open after sealing, or to train operators to prevent improper sterilizing and safety techniques.

With the known aforesaid and other problems and disadvantages associated with conventional autoclaves, the present invention was conceived and one of its objectives is to provide an autoclave closure apparatus and method which is both easy to use by relatively inexperienced personnel and which is fast and effective in its method of operation.

It is still another objective of the present invention to provide a closure apparatus and method for an autoclave which includes a movable gasket positioned within a channel around the chamber opening to efficiently seal the chamber.

It is also an objective of the present invention to provide a method for sealing an autoclave in which fluid is directed against a door gasket to move the gasket against the door to form a proper seal therewith and to provide suction to said fluid to break the seal for opening the door.

It is yet another objective of the present invention to provide a closure apparatus which includes a door which is pivotal and laterally slidable in operation.

Various other objectives and advantages of the present invention, apparent to those skilled in the art as a more detailed description of the invention is presented below.

SUMMARY OF THE INVENTION

The invention herein provides an apparatus and method for closing and sealing a chamber opening such as may be encountered in autoclave or sterilizer construction. The invention as presented provides a fast and efficient method to seal the autoclave during the sterilizing cycle and when the cycle is complete, to be able to quickly open the door without fear of being burned from escaping steam or allowing excess moisture into the room. The apparatus of the invention includes a motorized cam shaft which is pivotally joined to an autoclave door. In closing, with the assistance of a resilient coil spring, the door pivots to and laterally slides over the chamber opening and to be positioned in place. Next, a conduit delivers fluid under pressure such as steam into a gasket channel surrounding the chamber opening which forces a movable gasket therein outwardly against the closed door to provide an airtight seal around the door. Once the sterilizing cycle is complete, the steam pressure within the gasket channel is released with a vacuum pump which releases and removes the steam and air within the gasket channel and chamber therefrom. The gasket thereby moves from the door inwardly to the rear of the gasket channel so the door is then free to open. By reversing the direction of the cam shaft, the door slides across the chamber opening and pivots outwardly away from the opening whereby the contents within the chamber can be removed.

BRIEF DESCRIPTION OF THE DRAWINGS

FIG. 4 depicts manual closure apparatus with FIG. 4A illustrating the door in a closed positioned and FIGS. 4B and 4C illustrating opening of the door.

DESCRIPTION OF THE PREFERRED EMBODIMENT

Figure 2:
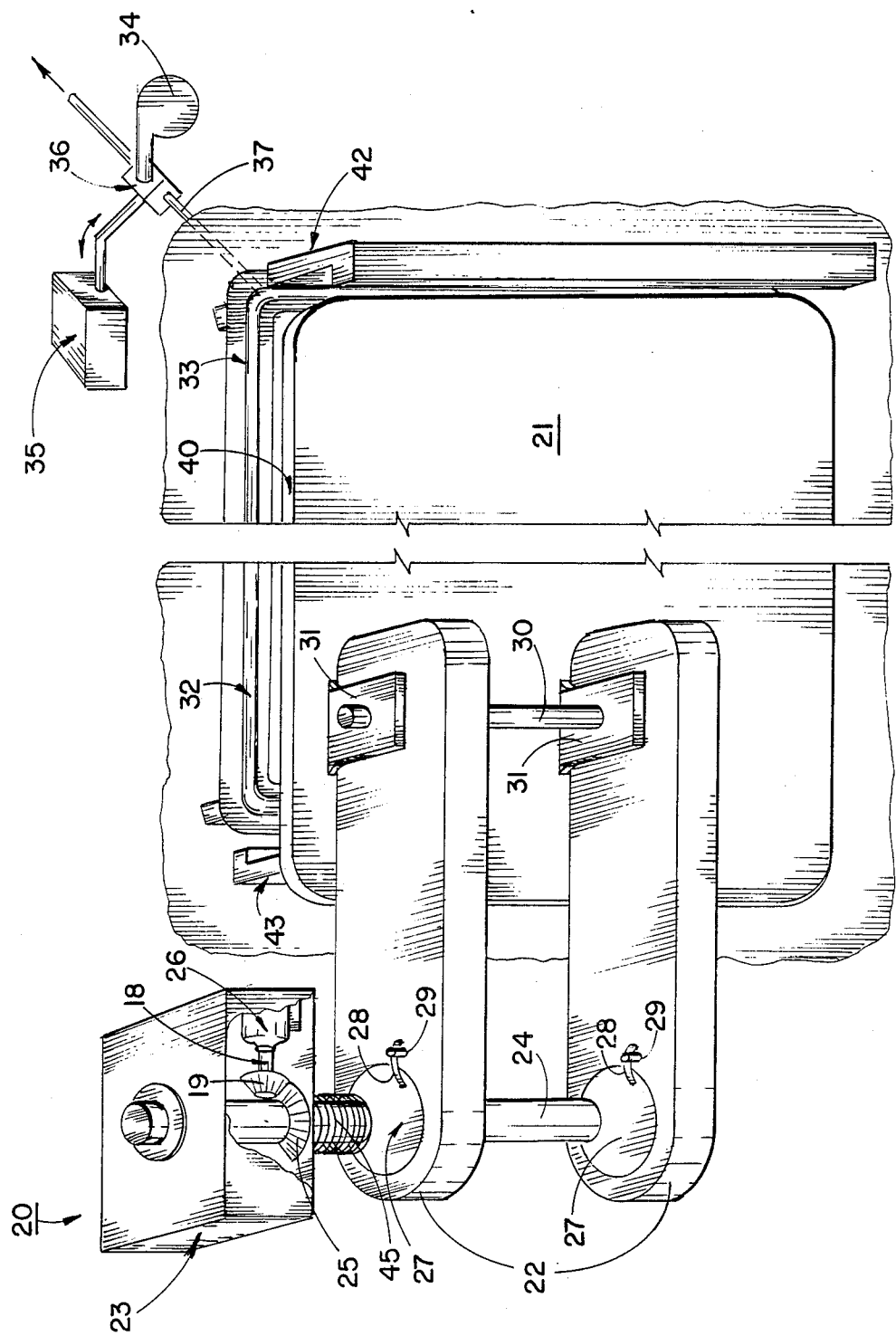
FIG. 2 shows a partial, enlarged version of the autoclave as shown in FIG. 1 with emphasis on the closure apparatus.

The preferred apparatus of the invention is shown in FIG. 2 whereby closure apparatus includes a door pivotally joined to hinges which are fitted with cams attached to a cam shaft. The cam shaft is driven by an electric motor and, due to the camming movement, allows the door to pivot to a closed position against the chamber opening and thereafter to laterally slide to a fully closed position. A movable gasket is positioned within a channel surrounding the opening and a steam supply and pump are joined to a channel conduit whereby steam passing through the conduit forces the gasket against the door when the door is fully closed. The pump is used for releasing pressure from the gasket by removing steam from the channel prior to opening the door at the completion of the sterilizing cycle.

The preferred method of the invention provides sealing the autoclave chamber by directing the door against the chamber opening by first pivotally closing the door against the chamber opening and next, laterally sliding the door to a fully closed position. Thereafter a fluid such as steam is directed against the gasket within the channel surrounding the opening to force the gasket forwardly against the door to provide a tight seal. To open the door at the conclusion of the sterilizing cycle the seal is released by use of a vacuum pump to remove the steam from within the gasket channel as the steam within the chamber is also evacuated to prevent steam escaping into the room, housing the autoclave.

DETAILED DESCRIPTION OF THE DRAWINGS AND OPERATION OF THE INVENTION

Figure 1:
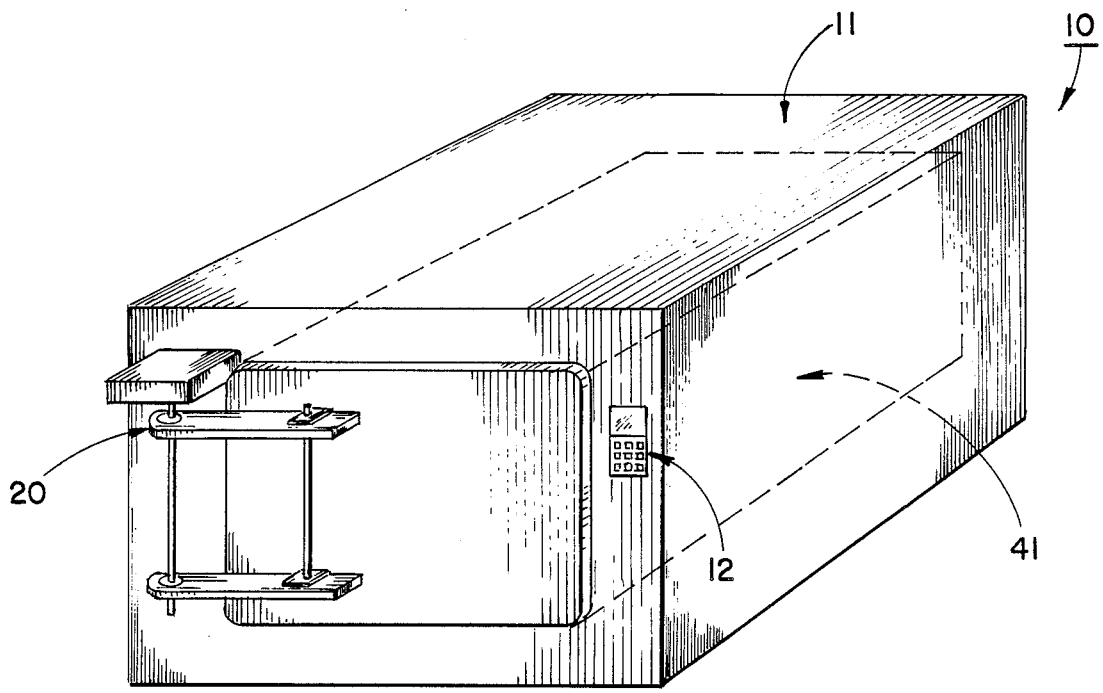
FIG. 1 illustrates in perspective fashion an autoclave utilizing a closure apparatus of the invention.

For a more complete understanding of the invention and its method of operation, turning now to the drawings, FIG. 1 illustrates autoclave 10 which includes closure apparatus 20 for releasably sealing sterilizer chamber 41 therein. As would be understood, chamber 41 is an insulated chamber within housing 11 and the sterilization process is accomplished by using steam or other medium as is customary in the sterilizing art. The length of the sterilizing cycle, temperatures and other criteria can be selected and entered in to programmable controls 12 as desired by the operator. Closure apparatus 20 is shown in an enlarged view in FIG. 2 whereby door 21 includes L-shaped door latch 43 on its rear edge, and as shown door 21 is pivotally attached to door drive mechanism 23 by pivot rod 30 which is bearingly supported by rod bearings 31 which are joined to door 21. Hinges 22 extend to door 21 and contained therein are cams 27 which are attached to cam shaft 24. Thus, as cam shaft 24 rotates cams 27 turn, causing hinge members 22 to move in an elliptical pattern thereby allowing door 21 to pivot and laterally move to secure chamber 41 as detailed in FIG. 3. Door drive mechanism 23 also includes fractional horsepower motor 26 which may be powered by an 110 volt AC source for rotating motor shaft 18 which is joined to shaft gear 19 which in turn engages cam shaft gear 25. As would be understood cam motor 26 is reversible for opening or closing door 21 as required. Mounted around autoclave opening 40 is gasket 32 which is movably positioned within gasket channel 33. As depicted in cross-sectional detail in FIG. 3 channel conduit 37 is in fluid communication with channel 33 and is joined to valve apparatus 36, vacuum pump 34 and steam supply 35, all conventional hardware. Once door 21 is in its fully closed position against opening 40, steam from supply 35 passes through channel conduit 37 and urges gasket 32 forwardly, against the inside of door 21 to thereby form an air tight seal for chamber 41.

Figure 3A:
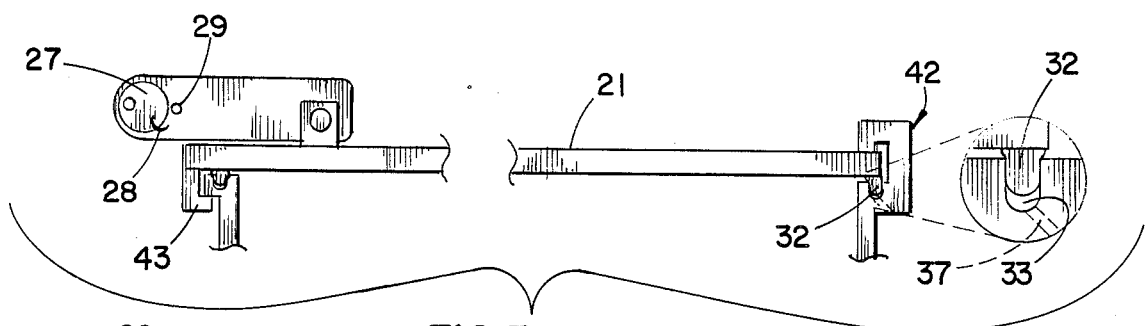
FIG. 3 demonstrates the details of the closing operation with FIGS. 3A-3D illustrating various steps in the method of opening the door.
Figure 3B:
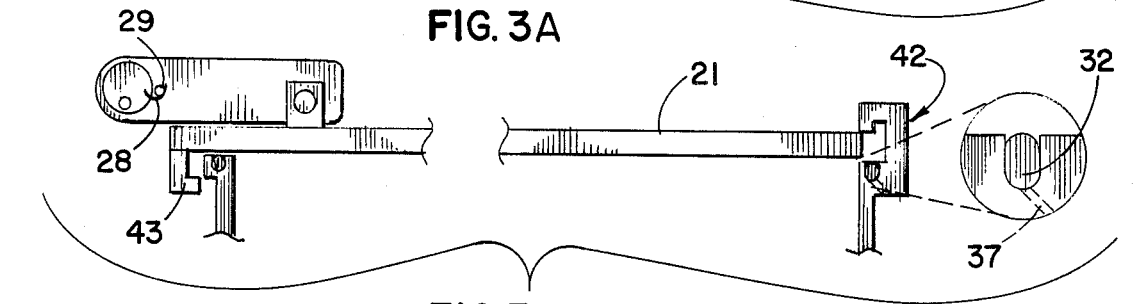
Figure 3C:
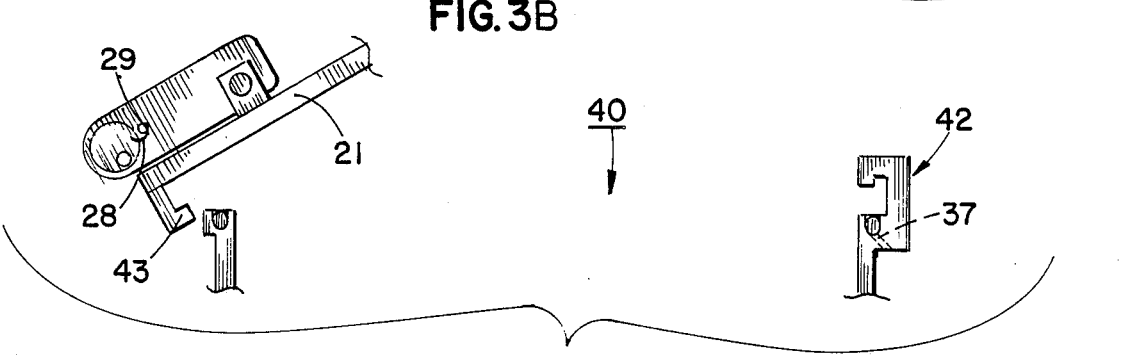
Figure 3D:
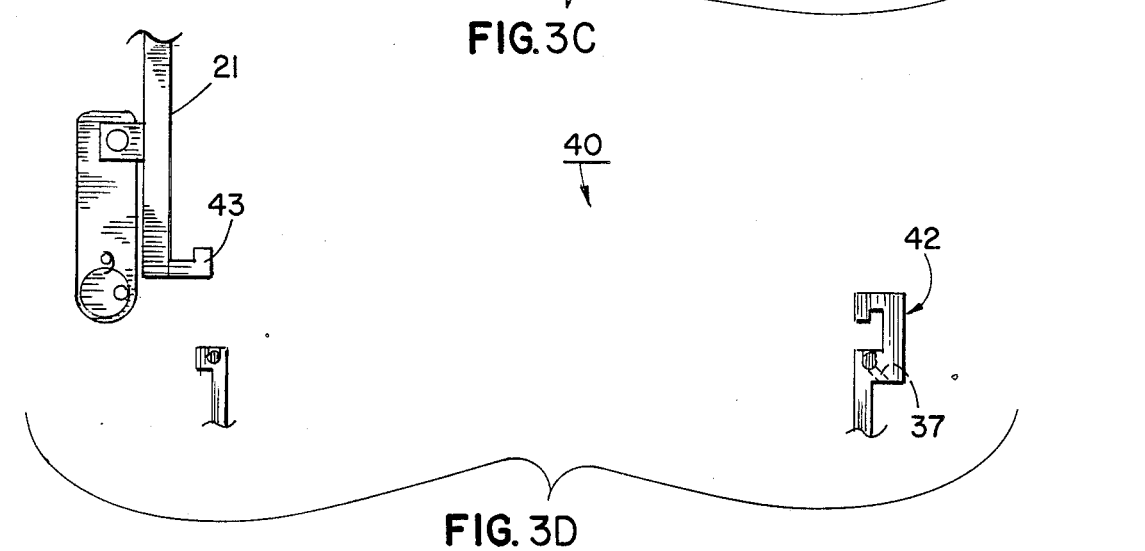

As shown in FIG. 3A-3D, closed door 21 in FIG. 3A, with gasket 32 urged against inside of door 21, is openable by first withdrawing gasket 32 from door 21 by the use of vacuum pump 34 (not seen in FIG. 3), and then rotating cam 27 laterally slides door 21 from right to left as shown in FIG. 3B. Thereafter, with the continued counterclockwise rotation of cam 27, cam latch 28 (FIG. 2) engages post 29 and door 21 pivots to open as shown in FIG. 3C, and to a fully opened position as shown in FIG. 3D. As would be understood, steam supply 35 as shown in FIG. 2 delivers steam under pressure through conduit 37 to force gasket 32 as shown in FIG. 3A against door 21. Valve apparatus 36 which is a conventional valve assembly maintains fluid pressure within conduit 37 and channel 33 until door 21 is to be opened. In FIG. 3B, gasket 32 has moved from an extended posture as pictured in FIG. 3A to a withdrawn position due to suction action of vacuum pump 34 (FIG. 1) which acts as a means to release the fluid or steam pressure within gasket channel 33. After door 21 has been opened as shown in FIGS. 3C and 3D, vacuum pump 34 then shuts off automatically. As earlier described, vacuum pump 34 or other pumping apparatus removes the steam simultaneously from chamber 41 to allow the sterilized contents therein to be safely and quickly removed.

To close door 21, the rotation of cam shaft 24 is reversed from that of the opening operation and with the assistance of coil spring 45, door 21 can be easily closed. Door 21 includes a L-shaped latch 43 joined to its rear edge, and at the opposite side of chamber 41, housing 11 includes an L-shaped latch or flange 42 for cooperatively receiving door 21 as shown in FIGS. 3A-3D. Latches 42 and 43 restrain the door against internal steam or other sterilizing medium pressure.

The method to releasably seal chamber 41 as shown in FIG. 1 comprises pivotally directing door 21 against chamber opening 40, to partially close opening 40, sliding the door laterally across the remaining opening, moving gasket 32 within channel 33 by fluid pressure (steam) against door 21 and maintaining gasket 32 against door 21 to form a tight seal around door 21 during the sterilizing process.

Another embodiment of the closure apparatus of the invention is seen in FIGS. 4A through 4C whereby closure apparatus 50 is of the manual type. Door 51 includes attached handle 52 and also on the front thereof is mounted stud 53 which is slidably engaged within slot 54 of hinge member 56. As would be understood from FIGS. 4A and 4B, handle 52 can be grasped and door 51 slid from right to left. Stud 53 thereby slides within slot 54. Hinge member 56 is pivotally mounted through hinge pin 57 and as shown in FIG. 4C, door 51 can be pivoted open around hinge pin 57. Chamber latch 58 receives the forward end of door of 51 as shown in FIG. 4A and door latch 59 which is on the rear edge of door 51 disengages from chamber lip 60 as shown in FIGS. 4B and 4C. Thus, closure apparatus 50 can be manually opened by grasping handle 52 and laterally sliding door 51 from right to left as shown in FIG. 4A and thereafter door 51 is pivoted to a fully opened position. Gasket 61 moves within gasket channel 62 as earlier explained to provide an air tight seal to door 51.

The illustrations and examples provided herein are for explanatory purposes and are not intended to limit the scope of the appended claims.

I claim:

1. Closure apparatus for a chamber housing comprising: a door, means to laterally slide and pivot said door on said chamber housing, said lateral slide/pivot means joined to said door, said lateral slide/pivot means comprising a cam, a hinge, said cam contiguous with said hinge, a cam shaft, said cam shaft joined to said cam, a cam latch, said cam latch affixed to said cam whereby said cam latch will engage said hinge to open said door as said cam rotates.

2. Closure apparatus as claimed in claim 1 and including a gasket channel, said channel attached to said chamber housing.

3. Closure apparatus as claimed in claim 1 wherein said lateral slide/pivot means comprises a latch post, said latch post positioned on said hinge.

4. Closure apparatus as claimed in claim 1 wherein said slide/pivot means comprises a substantially circular cam.

5. Closure apparatus as claimed in claim 4 and including means to drive said camshaft, said driving means joined to said camshaft.

6. Closure apparatus as claimed in claim 1 and including a gasket, said gasket positioned on said housing, means to move said gasket, said gasket moving means communicating with said gasket, said moving means comprising a means to supply fluid against said gasket.

7. Closure apparatus as claimed in claim 6 wherein said gasket moving means includes a fluid conduit.

8. Closure apparatus as claimed in claim 6 and including fluid supply means, said fluid supply means including a means to supply steam.

9. Closure apparatus as claimed in claim 6 wherein said gasket moving means includes a means to release pressure therefrom.

10. Closure apparatus as claimed in claim 9 wherein said pressure release means comprises a means to pump fluid therefrom.

11. Closure apparatus for a chamber housing to provide a releasable air tight seal around a chamber opening comprising: a door, means to laterally slide and pivot said door against the chamber opening, said lateral slide/pivot means joined to said door, said door positioned proximate said chamber housing, said lateral slide/pivot means comprising a circular cam, a hinge, said cam contiguous with said hinge, a cam shaft, said cam shaft joined to said cam, a cam latch, said cam latch affixed to said cam, a latch post, said latch post affixed to said hinge, a movable gasket, a gasket channel, said gasket channel positioned around said chamber opening, means to move said gasket, said gasket movably positioned within said channel, and said moving means communicating with said gasket channel to urge said gasket against said door when said door is positioned against the chamber opening.

12. Closure apparatus as claimed in claim 11 wherein said gasket moving means includes a fluid conduit.

13. Closure apparatus as claimed in claim 11 wherein said gasket moving means includes means to supply steam thereto.

14. Closure apparatus as claimed in claim 11 wherein said gasket moving means includes means to release pressure therefrom.

15. Closure apparatus as claimed in claim 14 wherein said pressure release means includes a means to pump a vacuum thereto.

16. A method to releasably seal a chamber within a housing, said chamber having an opening on the exterior of said housing, a door slidably, pivotally attached by a hinge to the housing with a gasket channel around the opening and having a movable gasket therein, said hinge having a cam rotatably positioned therein, a cam latch attached to said cam for engaging said hinge, comprising the steps of:
 (a) rotating the cam in a first direction to direct the door against the chamber opening to close the chamber,
 (b) moving said gasket within the channel against the closed door,
 (c) holding the gasket against the door to form a tight seal around the door, and
 (d) rotating the cam in a direction opposite said first direction whereby said cam latch will engage said hinge to open the door.

17. The method of claim 16 wherein the step of directing a door against the chamber opening comprises sliding the door against the chamber opening.

18. The method of claim 17 and including the step of pivoting the door towards the opening prior to sliding the door against the chamber opening.

19. The method of claim 16 wherein the step of moving a gasket against the closed door comprises forcing the gasket against the closed door by fluid pressure.

20. The method of claim 16 wherein the step of holding the gasket against the door comprises holding the gasket against the door by maintaining fluid pressure against said gasket.

21. The method of claim 16 and including the step of releasing the gasket from the door prior to opening the door.

22. A method of releasably sealing a chamber opening within a housing, the housing having a door with a cam driven hinge, a cam latch attached to said cam for engaging said hinge and a movable gasket in a channel surrounding the chamber opening comprising the steps of:
 (a) rotating the cam in a first direction to close the door against the chamber opening,
 (b) directing fluid into the gasket channel to move the gasket against the closed door and
 (c) rotating the cam in a direction opposite said first direction whereby said cam latch will engage said hinge to open the door.

23. The method of claim 22 wherein the step of directing fluid into the gasket channel comprises directing pressurized steam into the gasket channel.

24. The method of claim 22 and including the step of maintaining the gasket against the door by maintaining fluid pressure within the gasket channel.

25. The method of claim 22 and including the step of withdrawing the gasket from the door prior to opening the door.

26. The method of claim 25 wherein the step of withdrawing the gasket from the door comprises applying a vacuum to said gasket channel to move the gasket from the door.

* * * * *